United States Patent
Jinno et al.

(10) Patent No.: US 10,359,958 B2
(45) Date of Patent: *Jul. 23, 2019

(54) METHOD AND SYSTEM FOR MANAGING A STORAGE NETWORK TO REDUCE POWER CONSUMPTION

(71) Applicant: INTERNATIONAL BUSINESS MACHINES CORPORATION, Armonk, NY (US)

(72) Inventors: Mitsutoshi Jinno, Yamato (JP); Hiroyuki Miyoshi, Kawasaki (JP); Hiroyuki Tanaka, Sagamihara (JP); Yoshihiko Terashita, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,508

(22) Filed: Nov. 2, 2017

(65) Prior Publication Data

US 2018/0121118 A1    May 3, 2018

Related U.S. Application Data

(63) Continuation of application No. 15/134,947, filed on Apr. 21, 2016, now Pat. No. 9,858,005, which is a (Continued)

(51) Int. Cl.
*G06F 15/16* (2006.01)
*G06F 3/06* (2006.01)
*H04L 12/24* (2006.01)
*H04L 12/26* (2006.01)
*H04L 29/08* (2006.01)

(52) U.S. Cl.
CPC ............ *G06F 3/0625* (2013.01); *G06F 3/067* (2013.01); *G06F 3/0634* (2013.01); *G06F 3/0653* (2013.01); *H04L 41/069* (2013.01); *H04L 43/0811* (2013.01); *H04L 67/1097* (2013.01); *G06F 2213/0038* (2013.01); *Y02D 10/154* (2018.01)

(58) Field of Classification Search
CPC .................................................... G06F 3/0625
See application file for complete search history.

(56) References Cited

U.S. PATENT DOCUMENTS 6,636,981 B1 * 10/2003 Barnett ............... G06F 11/0727
    709/224
7,437,462 B2   10/2008 Marks et al.
(Continued)

*Primary Examiner* — Douglas B Blair
(74) *Attorney, Agent, or Firm* — Griffiths & Seaton PLLC

(57) ABSTRACT

Various embodiments are provided for managing a storage network system. The storage network system includes a plurality of zones. Each of the plurality of zones includes at least one storage network device. A link-down event associated with one of the storage network devices is detected. A determination of whether alternative storage network devices in an identified one of the plurality of zones where the link-down event occurred are in a link-down state, where at least a zone table and a routing table is used for the determining. In response to all of the storage network devices being in the link-down state, the identified one of the plurality of zones where the link-down event occurred is placed in a down state.

20 Claims, 4 Drawing Sheets

Related U.S. Application Data continuation of application No. 12/978,814, filed on Dec. 27, 2010, now Pat. No. 9,329,790.

(56) References Cited

U.S. PATENT DOCUMENTS

| | | | |
|---|---|---|---|
| 7,529,980 B2 | 5/2009 | Henning et al. | |
| 7,533,169 B1 * | 5/2009 | Gold | H04L 41/12 709/223 |
| 7,536,584 B2 * | 5/2009 | Davies | G06F 11/0727 714/5.11 |
| 7,685,269 B1 * | 3/2010 | Thrasher | G06F 9/4843 709/224 |
| 7,721,021 B2 | 5/2010 | Johnson | |
| 7,738,366 B2 * | 6/2010 | Uddenberg | H04L 43/0817 370/229 |
| 8,015,420 B2 | 9/2011 | Cherian et al. | |
| 9,270,580 B1 * | 2/2016 | Abraham | H04L 45/22 |
| 9,329,790 B2 * | 5/2016 | Jinno | G06F 3/0625 |
| 2007/0038679 A1 * | 2/2007 | Ramkumar | H04L 41/082 |
| 2007/0220204 A1 * | 9/2007 | Nakajima | G06F 3/0607 711/114 |
| 2008/0301147 A1 * | 12/2008 | Yellapragada | H04L 41/0893 |
| 2009/0006501 A1 * | 1/2009 | Bharadwaj | H04L 67/1097 |
| 2009/0094620 A1 * | 4/2009 | Kalwitz | G06F 11/2089 719/325 |
| 2009/0222733 A1 * | 9/2009 | Basham | G06F 3/0605 715/736 |
| 2010/0229048 A1 * | 9/2010 | Karam | H04L 12/10 714/48 |
| 2011/0022691 A1 * | 1/2011 | Banerjee | H04L 49/10 709/221 |
| 2011/0231541 A1 * | 9/2011 | Murthy | G06F 3/0613 709/224 |
| 2011/0246803 A1 * | 10/2011 | Myrah | G06F 1/206 713/324 |
| 2012/0047325 A1 * | 2/2012 | Sakuma | G06F 11/0727 711/114 |
| 2012/0144002 A1 * | 6/2012 | Naganuma | G06F 3/0605 709/220 |

\* cited by examiner

METHOD AND SYSTEM FOR MANAGING A STORAGE NETWORK TO REDUCE POWER CONSUMPTION

CROSS REFERENCE TO RELATED APPLICATIONS

This Application is a Continuation of U.S. patent application Ser. No. 15/134,947, filed on Apr. 21, 2016, which is a Continuation of U.S. Pat. No. 9,329,790, filed on Dec. 27, 2010.

FIELD OF THE INVENTION

The present invention relates in general to storage networks, and more particularly to methods, computer systems, and computer program products for managing storage networks to reduce power consumption.

DESCRIPTION OF THE RELATED ART

Modern storage networks (or Storage Area Networks (SAN)), typically include multiple "initiator" devices (e.g., hosts) and "target" devices (e.g., storage devices) interconnected through a storage interface, such as a Serial Attached SCSI (SAS) storage interface.

A SAS network (or SAS domain) also includes one or more SAS expander device which function as a switch and performs routing of a SAS frame from an initiator to a target. The SAS expander performs a SAS discovery process at initialization to obtain various information, such as the SAS addresses, device types (initiator, target, and expander), and supported protocols of all devices in the SAS domain and the identity of the SAS expanders to which all devices in the SAS domain are physically connected and position information indicating to which physical connection (PHY) of the SAS expanders the devices are connected. The SAS expander also generates a routing table on the basis of the above information and uses it for the routing of the SAS frame.

Moreover, the SAS supports a zoning function for controlling an access between devices. This function is used to assign zone identifications to SAS devices and to set which zones are allowed to access each other. Normally, one or more hosts are defined for a zone, one or more storages are defined for another zone, and the accessibility of the zones is defined for operation. Zoning is a function essential to many users for security.

A significant issue in storage networks, including SAS networks, is that of the power consumption of the various devices within the networks. One of the reasons managing the power consumption is difficult is that conventional networks do not include the functionality to determine which devices within the network are accessing other devices or being accessed from other devices.

SUMMARY OF THE DESCRIBED EMBODIMENTS

Various embodiments are provided for managing a storage network system. The storage network system includes a plurality of zones. Each of the plurality of zones includes at least one storage network device. A link-down event associated with one of the storage network devices is detected. A determination of whether alternative storage network devices in an identified one of the plurality of zones where the link-down event occurred are in a link-down state, where at least a zone table and a routing table is used for the determining. In response to all of the storage network devices being in the link-down state, the identified one of the plurality of zones where the link-down event occurred is placed in a down state.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

According to one aspect of the present invention, a method is provided for reducing power consumption in an SAS domain by using zone setting information. In one embodiment, a routing storage network device (e.g., an SAS expander) identifies an end device which is not accessed by anyone or which does not access anyone at that time on the basis of the zone setting information and the routing table. The SAS expander closely controls the power state of the end devices and the connected physical (PHY) state, thereby achieving power consumption saving.

The SAS expander is thus provided with functionality for identifying a device which is not accessed by anyone or which does not access anyone at that time on the basis of the zone setting information and the routing table during link-down of an arbitrary device or at the time of change in zone setting, as well as for identifying a device which has the possibility of being accessed and is deliberately placed in a disabled state by the SAS expander on the basis of the zone setting information and the routing table during link-up of an arbitrary device or at the time of change in zone setting.

The SAS expander is also configured to minimize the power consumption of the identified target device by spin-down or the like by using an existing technology and disabling the PHY connected to the identified device by using an existing technology.

As a result, embodiments of the present invention enable power consumption reduction saving without use of any particular device (hardware), without departing from the SAS standard, without losing data availability, and with no or minimum effect on performance.

The present invention is a technique in which the SAS expander identifies a device which is not accessed by anyone or which does not access anyone surely at that time by utilizing the zone setting information and reduces the power consumption of the device as much as possible, thereby achieving energy saving. However, it should be understood that the method(s) described herein may be applicable to other storage networks (or Storage Area Network (SAN)) interfaces besides SAS, such as a Fibre Channel-based storage networks and iSCSI-based storage networks using a switch.

Figure 1:
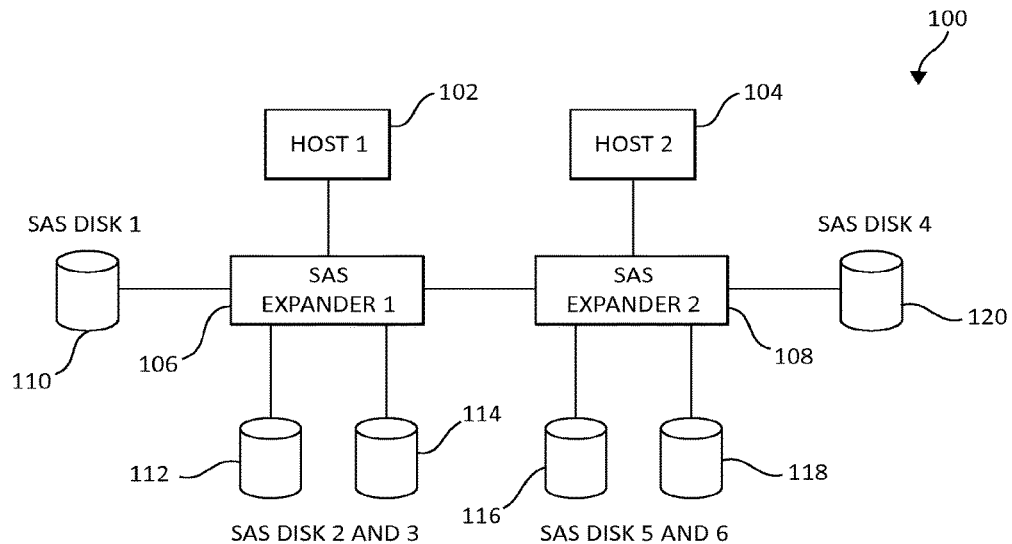
FIG. 1 is block diagram of a storage network according to one embodiment of the present invention.

FIG. 1 illustrates an SAS domain 100 according to one embodiment of the present invention. The SAS domain 100 includes a first host 102, a second host 104, a first SAS expander 106, a second SAS expander 108, and six SAS disks 110-120. The first and second hosts 102 and 104 are in operable communication with the SAS disks 110-120 through the SAS expanders 106 and 108 as shown in FIG. 1.

As shown, in FIG. 2, the SAS domain may be assumed to includes a plurality of zones defined as follows: Zone 11—Host 1; Zone 12—Host 2; Zone 21—SAS disk 1; Zone 22—SAS disk 2 and SAS disk 3; Zone 31—SAS disk 4; and Zone 32—SAS disk 5 and SAS disk 6.

Figure 3:
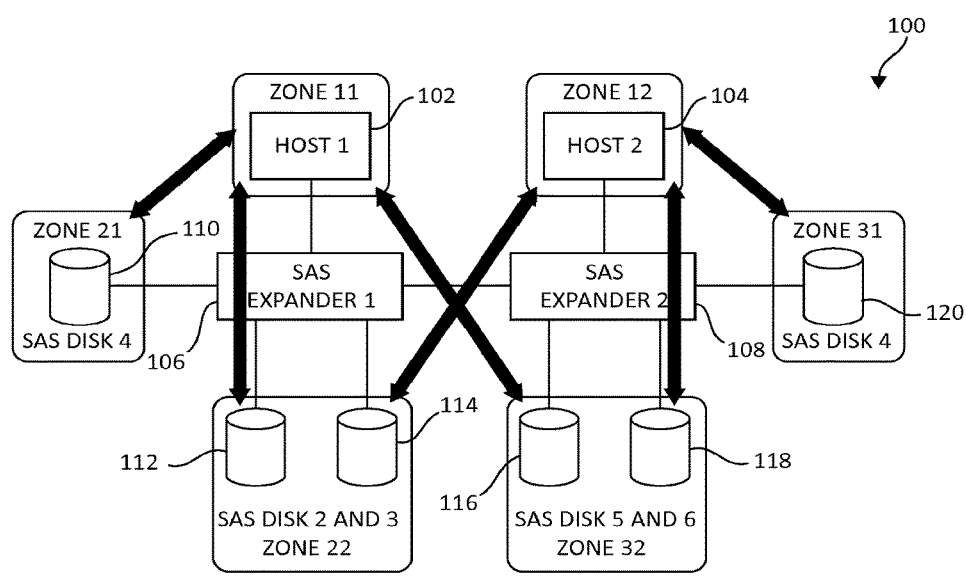
FIG. 3 is a block diagram of the storage network of FIG. 2 illustrating accessibility between the zones, according to one embodiment of the present invention.

Referring now to FIG. 3, accessibility to or from the respective zones are assumed to be defined as follows: Zone 11↔Zone 21, Zone 22, Zone 32; and Zone 12↔Zone 31, Zone 22, Zone 32. Refer to FIG. 3 for clarification.

A zone manager (not shown) sets the zone setting information provided by users to each of the SAS expanders 106 and 108. As an interface, a SAS in-band Serial Management Protocol (SMP), the Ethernet, or the like is used. If the zoning function is enabled, the SAS expander implements zoning by reflecting the zone setting information on routing when performing SAS frame routing.

In one embodiment, a zone status table is added to the SAS expander (i.e., the first SAS expander 106 and/or the second SAS expander 108). This table is used in "unused zone shutdown processing" described herein and simply needs to hold a 1-bit alive/down state for each zone.

Figure 4:
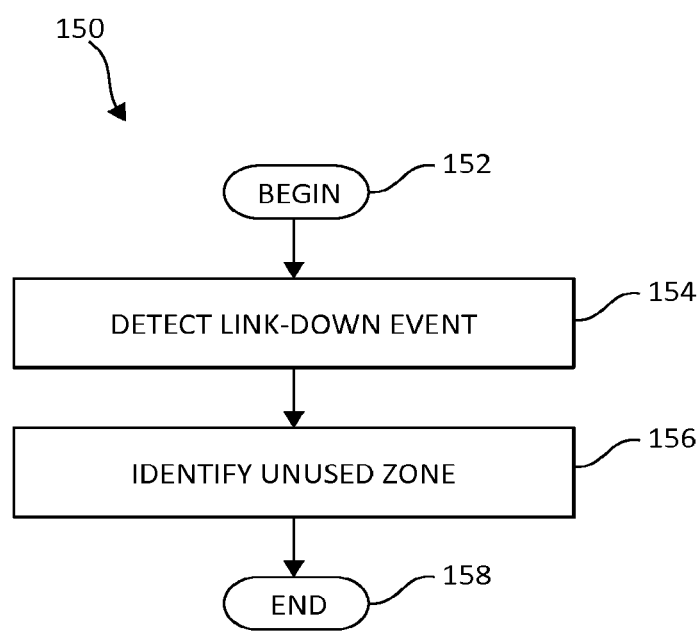
FIG. 4 is a flow chart of a method for managing a storage network according to one embodiment of the present invention.

FIG. 4 illustrates a method 150 for managing a storage network system, according to one embodiment of the present invention. It should be understood that the steps shown in FIG. 4 present a simplified version of the method 150, which may include addition steps, as described in greater detail below. At step 152, the method 150 begins with the storage network (e.g., a SAS network) being initiated. The storage network includes multiple zones, with each zone including one or more network devices. At step 154, a link-down event (e.g., a device failure) associated with a storage network device within the network is detected. At step 156, a zone in the storage network is identified as being "unused." However, this identification only occurs if the zone is not accessed by storage network devices in other zones and the zone does not access storage network devices in other zones. At step 158, the method 150 ends, with for example, the power consumption of the link-down device being reduced.

As mentioned above, additional details of the method 150 will now be described. The SAS expander (106 and/or 108) and the SAS device (i.e., the first host 102, the second host 104, and/or one or more of the SAS disks 110-120) conventionally perform initialization at the time of power-on. Specifically, the SAS discovery process is performed to obtain the SAS addresses, the device types, supported protocols, connected SAS expanders, and PHY positions of all devices in the SAS domain. It should be understood that the SAS expanders 106 and 108 may be self-configuring expanders, as is commonly understood.

It is assumed that one SAS device breaks down and the connected SAS expander detects a link-down (i.e., a device failure, a cable failure, a planned device power interruption, or the like). The SAS expander, upon detecting the link-down, immediately transmits a BROADCAST signal to all devices in the SAS domain 1 to give notice of the link-down condition. Thereafter, the SAS expander performs the SAS discovery process again and updates the routing table stored therein. In one example, the first host 102 breaks down and the first SAS expander 106 detects the link-down of the first host 102.

The SAS expander then performs the following unused-zone shutdown processing. First, the SAS expander identifies the zone to which the link-down device belongs on the basis of the zone table. In the example, in which the first host 102 breaks down, the identified zone is Zone 11 (FIG. 3). The SAS expander then checks whether all devices in the identified zone are in the link-down state. In this operation, the SAS expander refers to the zone table and the routing table. If all devices are in the link-down state, the SAS expander places the zone (e.g., Zone 11) in a down state on the zone status table. Otherwise, the SAS expander terminates the unused-zone shutdown processing at this point. If the zoning function itself is disabled, the SAS expander terminates the unused-zone shutdown processing directly. In the example in which the first host 102 breaks down, Zone 11 is disabled.

Subsequently, the SAS expander checks whether there is a zone satisfying the following condition as a result of placing the zone (e.g., Zone 11) in the down state. The condition is whether there are any zones not being accessed from any effective zone and not accessing any effective zone. Such a zone is determined to be an "unused" zone. In the example involving the first host 102, Zone 21 is an unused zone. Zone 22 and Zone 32 do not satisfy the conditions as they are accessible from Zone 12.

The SAS expander then initiates shutdown processing. The SAS expander checks the device type of the device(s) included in the unused zone(s). Note that device types have already been obtained at initialization.

If the device types of all devices are "target" devices, the SAS expander determines the devices in the unused zone to be storage devices. In the example involving the first host 102, Zone 21 includes only the SAS disk 1 and is therefore applicable.

The SAS expander then determines whether the storage devices are directly connected to the expander (e.g., the first SAS expander 106) on the basis of the routing table. If there is a directly-connected device, the SAS expander performs processing of minimizing the power consumption of the storage device, such as transmitting an SCSI command to spin down the disk. If the target device is equipped with an external control which shifts to a lower electric power state such as power-off, such a function may also be used. Moreover, the SAS expander disables the PHY connection (or a plurality of PHY connections in the case of a multi-lane) connected to the storage to prevent the IDLE primitive from flowing. If the SAS expander supports the low power mode for each PHY, the use of the low mode enhances the effect. The storage spin-down and the disabling of the PHY are utilized to achieve a power-saving effect. In the first host 102 example, the first SAS expander 106 spins down SAS disk 110 and disables the connected PHY.

If the device type of all devices is "initiator," or includes both of the "initiator" type and the "target" type, the SAS expander determines whether these devices are directly connected to the SAS expander on the basis of the routing table. If there is a device directly connected to the SAS expander, the SAS expander disables the PHY connection (or a plurality of PHY connections in the case of a multi-lane) connected to the device to prevent the IDLE primitive from flowing. If the expander supports the low power mode for each PHY, the use of the mode enhances the effect. A power saving effect is achieved by disabling the PHY.

The shutdown processing described herein is performed only for a zone identified as an unused zone. Therefore, the processing is not performed for a PHY linked down first due to a failure or the like, for example. This enables the SAS expander to detect link-up if the broken device recovers.

If the SAS expander detects a new device due to the recovery of a broken device, the SAS expander performs a process in reverse to that described above ("recovery" processing). For example, the first host 102 recovers and the link-up occurs.

In such a situation, the SAS expander checks a zone to which the recovered device belongs on the basis of the zone table (e.g., Zone 11 for the first host 102). The SAS expander then checks for zones accessible from the zone of the recovered device using the zone permission table (e.g., Zones 21, 22, and 32 are accessible from Zone 11). Next, the SAS expander checks the zone status table to confirm whether the zone checked in the above step is placed in the down state as part of the unused-zone shutdown processing. (e.g., Zone 21).

If the zone is in the down state, the SAS expander performs power-on processing of the devices in that zone to place the zone in the alive state on the zone status table. The power-on processing is to enable the connected PHY for a device directly connected to the SAS expander among the devices in the zone. In the case of a "target" device type, the SAS expander further performs spin-up or other recovery processing from the disabled state caused by the shutdown processing described above. In the example in which the first host 102 has recovered, the first SAS expander 106 enables the connected PHY and further spins up SAS disk 110.

For a device which is once identified as an unused zone by the SAS expander and for which shutdown processing is performed, the connected PHY is disabled. Therefore, even if some event occurs for the device in the zone during the disabled state, the SAS expander is not aware of the event. However, when the device using the unused zone appears in the SAS domain, the SAS expander performs power-up processing of the unused zone. Thereafter, an event of the device is correctly broadcasted. The present invention is based on an idea that other devices in the SAS domain do not need to grasp the latest state of the device which is not accessed by anyone or which does not access anyone.

As described above, the present invention is a technique in which the SAS expander saves power by identifying a device which is not accessed by devices and which does not access other devices by using the zone setting information and reducing the power consumption of the device, and the storage network as a whole, as much as possible.

In the case where a host device breaks down, the SAS expander determines a storage device used only by the host to be unnecessary and disables the storage device. In the case where a storage device breaks down and a path to the host is unnecessary, the SAS expander disables the path to the host device. It should also be understood that steps 3 and 4 may be performed when a change in zone setting is applied to the SAS expander.

Additionally, the SAS expander may perform the method (s) described herein on a regular, scheduled basis. Such activity may have several benefits. If the host device is not connected yet, a storage device used only by the host device is disabled. If there is a backup storage or host device, zoning is set in such a way that no one can access the backup storage or host device in a normal standby state. As such, any particular setting is not needed and the SAS expander in the SAS domain automatically maintains these devices in the minimum power consumption state. When backup operation or recovery is actually performed by using the backup storage or backup host, it is only necessary to change the zone setting dynamically.

Furthermore, method(s) described herein may be beneficial when a single zone includes both of the host and the target in question. In the example(s) described above, if all devices included in a particular zone are in the link-down state, the SAS expander shuts down all devices in another zone having been accessed only from or accessed only that zone.

However, if initiator and target elements are added, the following policies may also be used. If all initiators included in a particular zone are in the link-down state, the SAS expander shuts down all targets in another zone having been accessed only from the certain zone. If all targets included in a particular zone are in the link-down state, the SAS expander shuts down all initiators in another zone having accessed only the certain zone.

Such policies may be implemented in a manner similar to those described above. However, entries in the zone status table may be increased from 1 bit to 2 bits to manage all initiator statuses in the zone and all target statuses in the zone, as opposed to managing one status of the entire zone. Then, when shutdown and recovery processing are performed, an unused zone is not identified, but an unused zone initiator group or unused zone target group is identified to perform shutdown processing or recovery processing.

Figure 5:
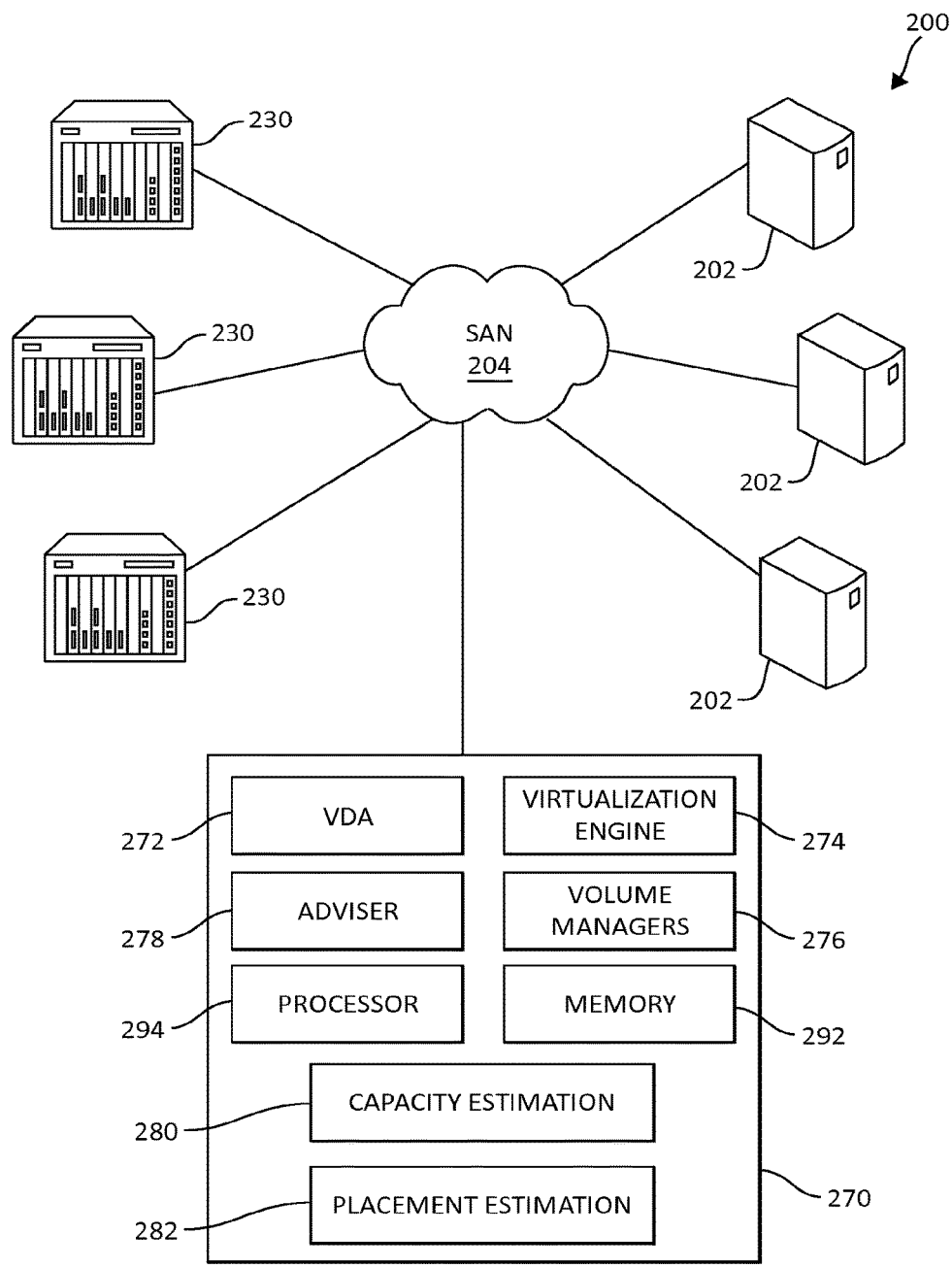
FIG. 5 is a block diagram of an exemplary storage network according to another embodiment of the present invention.

FIG. 5 shows one embodiment of a SAN 200 according to an embodiment of the present invention. In FIG. 5, servers 202 are coupled to data storage devices 230 via SAN interconnect 204. Each server 202 and each storage device 230 is coupled to SAN interconnect 204. Servers 202 have direct access to any of the storage devices 230 connected to the SAN interconnect 204. SAN interconnect 204 can be a high speed interconnect, such as Fibre Channel or small computer systems interface (SCSI). In addition, SAN interconnect 204 can be an Internet Small Computers System Interface (iSCSI), a Fiber Connectivity (FICON) storage protocol, or Serial Attached SCSI (SAS) attached storage. As FIG. 2 shows, the servers 202 and storage devices 230 comprise a network in and of themselves.

Figure 2:
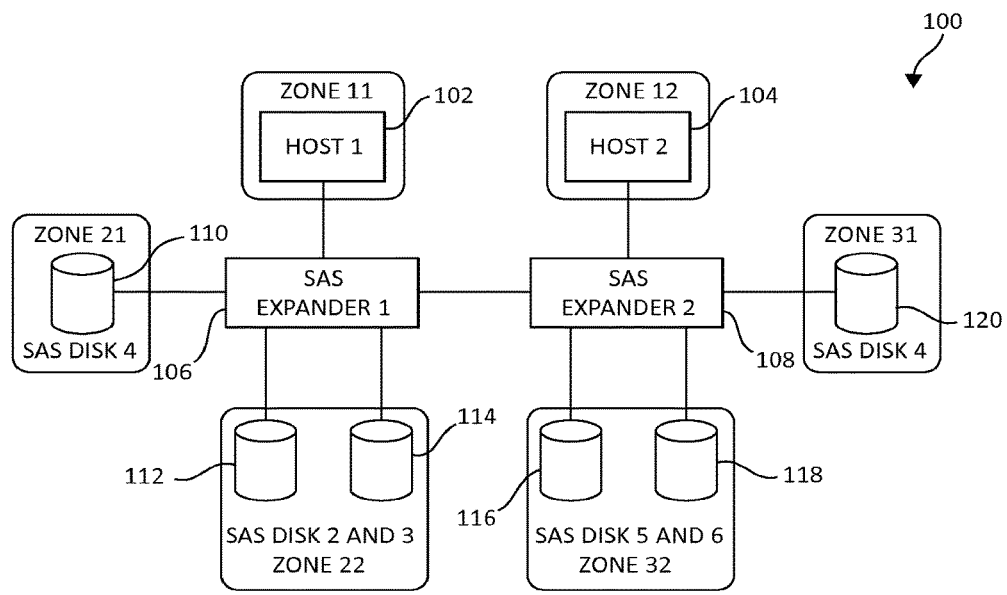
FIG. 2 is a block diagram of the storage network of FIG. 1 illustrating a zoning scheme within the storage network.

In the SAN 200 of FIG. 2, no server 202 is dedicated to a particular storage device 230 as in a LAN. Any server 202 may access any storage device 230 on the SAN 200 in FIG. 2. Typical characteristics of a SAN 200 may include high bandwidth, a multitude of nodes per loop, a large connection distance, and a very large storage capacity. Consequently, the performance, flexibility, and scalability of a Fibre Channel based SAN 200 may be significantly greater than that of a typical SCSI based system.

FIG. 5 also shows a network administrator 270 coupled to the SAN interconnect 204. Being able to effectively allocate storage 230 in a SAN 200 in a manner that provides for adequate data protection and recoverability is of particular importance. Because multiple hosts may have access to a particular storage array 230 in a SAN 200, prevention of unauthorized and/or untimely data access is desirable. Zoning is an example of one technique that is used to accomplish this goal. Zoning allows resources to be partitioned and managed in a controlled manner. The administrator 270 may be used to map hosts to storage and provide control to allocation of the storage devices 230.

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions (i.e., executable portions) for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for managing a storage network system comprising a plurality of zones, each of the plurality of zones comprising at least one storage network device, the method comprising:
    detecting a link-down event associated with one of the storage network devices, wherein the link-down event is at least one of a device failure, a cable failure, and a planned device power interruption;
    determining whether alternative storage network devices in an identified one of the plurality of zones where the link-down event occurred are in a link-down state, wherein at least a zone table and a routing table is used for the determining; and
    in response to all of the storage network devices being in the link-down state, placing the identified one of the plurality of zones where the link-down event occurred in a down state, wherein power consumption of the storage network devices in the identified one of the plurality of zones is reduced.

2. The method of claim 1, further comprising identifying one of the plurality of zones as being unused if the zone is not accessed by another of the storage network devices in another of the plurality of zones and if the zone does not access another of the storage network devices in another of the plurality of zones.

3. The method of claim 2, wherein each of the storage network devices is a target storage network device, an initiator storage network device, or a combination thereof.

4. The method of claim 3, wherein the storage network system further comprises a routing storage network device configured to communicatively interconnect the storage network devices.

5. The method of claim 4, wherein the storage network system is a Serial Attached SCSI (SAS) storage network system.

6. The method of claim 4, wherein the reducing the power consumption of the zone identified as being unused comprises disabling a physical connection between the routing storage network device and the one of the storage network devices.

7. The method of claim 6, further comprising identifying the respective zone as being used if the zone is accessed by another of the storage network devices in another of the plurality of zones or if the zone does not access another of the storage network devices in another of the plurality of zones after the respective zone is identified as being unused.

8. A routing storage network device for managing a storage network system comprising a plurality of zones, each of the plurality of zones comprising at least one storage network device, the routing storage network device comprising:
    a computer-readable medium; and
    a processor in operable communication with the computer-readable medium and executing instructions stored therein, wherein when executing the instructions, the processor:
        detects a link-down event associated with one of the storage network devices, wherein the link-down event is at least one of a device failure, a cable failure, and a planned device power interruption,
        determines whether alternative storage network devices in an identified one of the plurality of zones where the link-down event occurred are in a link-down state, wherein at least a zone table and a routing table is used for the determining; and
        in response to all of the storage network devices being in the link-down state, places the identified one of the plurality of zones where the link-down event occurred in a down state, wherein power consumption of the storage network devices in the identified one of the plurality of zones is reduced.

9. The routing storage network device of claim 8, wherein, when executing the instructions, the processor identifies one of the plurality of zones as being unused if the zone is not accessed by another of the storage network devices in another of the plurality of zones and if the zone does not access another of the storage network devices in another of the plurality of zones.

10. The routing storage network device of claim 9, wherein each of the storage network devices is a target storage network device, an initiator storage network device, or a combination thereof.

11. The routing storage network device of claim 10, wherein the routing storage network device is configured to communicatively interconnect the storage network devices.

12. The routing storage device of claim 11, wherein the storage network system is a Serial Attached SCSI (SAS) storage network system.

13. The routing storage device of claim 11, wherein the reducing the power consumption of the zone comprises disabling a physical connection between the routing storage network device and the one of the storage network devices.

14. The routing storage device of claim 13, wherein, when executing the instructions, the processor identifies the respective zone as being used if the zone is accessed by another of the storage network devices in another of the plurality of zones or if the zone does not access another of the storage network devices in another of the plurality of zones after the respective zone is identified as being unused.

15. A non-transitory computer-readable storage medium storing a computer program product for managing a storage network system comprising a plurality of zones, each of the plurality of zones comprising at least one storage network device, the non-transitory computer-readable storage medium having computer-readable program code portions stored thereon, the computer-readable program code portions comprising:
    computer program code for detecting a link-down event associated with one of the storage network devices, wherein the link-down event is at least one of a device failure, a cable failure, and a planned device power interruption;
    computer program code for determining whether alternative storage network devices in an identified one of the plurality of zones where the link-down event occurred are in a link-down state, wherein at least a zone table and a routing table is used for the determining; and
    computer program code for, in response to all of the storage network devices being in the link-down state, placing the identified one of the plurality of zones where the link-down event occurred in a down state, wherein power consumption of the storage network devices in the identified one of the plurality of zones is reduced.

16. The non-transitory computer-readable storage medium of claim 15, further comprising computer program code for identifying one of the plurality of zones as being unused if the zone is not accessed by another of the storage network devices in another of the plurality of zones and if the zone does not access another of the storage network devices in another of the plurality of zones.

17. The non-transitory computer-readable storage medium of claim 16, wherein each of the storage network devices is a target storage network device, an initiator storage network device, or a combination thereof.

18. The non-transitory computer-readable storage medium of claim 17, wherein the storage network system further comprises a routing storage network device configured to communicatively interconnect the storage network devices, and wherein the storage network system is a Serial Attached SCSI (SAS) storage network system.

19. The non-transitory computer-readable storage medium of claim 17, wherein the reducing the power consumption of the zone comprises disabling a physical connection between the routing storage network device and the one of the storage network devices.

20. The non-transitory computer-readable storage medium of claim 19, further comprising computer program code for identifying the respective zone as being used if the zone is accessed by another of the storage network devices in another of the plurality of zones or if the zone does not access another of the storage network devices in another of the plurality of zones after the respective zone is identified as being unused.

* * * * *